US009355556B2

(12) United States Patent
Schockmel et al.

(10) Patent No.: US 9,355,556 B2
(45) Date of Patent: May 31, 2016

(54) CONFIGURABLE ACCESS CONTROL SENSING DEVICE

(75) Inventors: Paul Schockmel, Fischbach (LU); Laurent Uhres, Warsaw (PL); Patrick Roulling, Ospern (LU); Sam Calmes, Luxembourg (LU); Marc Schifflers, Konz (DE); Stephen Fuks, Ann Arbor, MI (US)

(73) Assignee: IEE International Electronics & Engineering S.A., Echternach (LU)

( * ) Notice: Subject to any disclaimer, the term of this patent is extended or adjusted under 35 U.S.C. 154(b) by 585 days.

(21) Appl. No.: 13/641,196

(22) PCT Filed: Apr. 14, 2011

(86) PCT No.: PCT/EP2011/055919
§ 371 (c)(1),
(2), (4) Date: Apr. 26, 2013

(87) PCT Pub. No.: WO2011/128408
PCT Pub. Date: Oct. 20, 2011

(65) Prior Publication Data

US 2013/0201286 A1 Aug. 8, 2013

(30) Foreign Application Priority Data

Apr. 15, 2010 (LU) ........................................ 91 677
Jun. 9, 2010 (EP) .................................... 10165397
Nov. 16, 2010 (LU) ........................................ 91 753

(51) Int. Cl.
*H04N 7/18* (2006.01)
*G08C 19/00* (2006.01)
(Continued)

(52) U.S. Cl.
CPC ............ *G08C 19/00* (2013.01); *G07C 9/00111* (2013.01); *G07C 9/025* (2013.01); *G07C 9/00126* (2013.01); *G07C 9/00134* (2013.01)

(58) Field of Classification Search
CPC ........ G07C 9/00; G07C 9/025; G07C 9/0007; G07C 9/00087; G07C 9/00111; G07C 9/00126; G07C 9/00134; G06K 9/00771; G06K 9/00335; G06K 9/00778; G06K 9/00295; G06B 13/19602; G06B 13/19608; G06B 13/19652; G06T 2207/30232; H04N 7/18
USPC .......................................................... 348/156
See application file for complete search history.

(56) References Cited

U.S. PATENT DOCUMENTS 6,504,470 B2 * 1/2003 Puchek et al. ............... 340/5.53
7,623,674 B2 * 11/2009 Nichani et al. ................ 382/103

(Continued)

FOREIGN PATENT DOCUMENTS

EP 1772752 A1 4/2007

OTHER PUBLICATIONS

International Search Report; International Application No. PCT/EP2011/055919; International Filing date Apr. 14, 2011; Mail date Jun. 10, 2011.

(Continued)

*Primary Examiner* — Michael Lee
(74) *Attorney, Agent, or Firm* — Reising Ethington P.C.

(57) ABSTRACT

An access control device comprises at least one transit authorization request device, such as an ID sensor activated by access card or badge or a biometric sensor (fingerprint, retina), said transit authorization request device to be activated by a person requesting authorization to pass through said passageway or doorway and a presence detection and tracking device for detecting the presence of a person in the vicinity of said passageway or doorway and for tracking the movement of a person within or through said passageway or doorway. According to the invention, the access control device further comprises a control unit configured for assigning a virtual transit ticket to a person after authorization to pass through said passageway or doorway has been granted to said person, said virtual transit ticket being representative of the transit privileges granted to said person, i.e. the privileges regarding the transit direction through said passageway of doorway, and for controlling said presence detection and tracking device to track the movement of the person with the virtual transit ticket with respect to the granted transit privileges, said control unit comprising a processing module with a configurable decision table for generating an output control signal based on an output signal of said at least one transit authorization request device and an output signal of said presence detection and tracking device, said output control signal to be used for the controlling of the passage of persons through a passageway or a doorway.

10 Claims, 5 Drawing Sheets

(51) Int. Cl.
*G07C 9/02* (2006.01)
*G07C 9/00* (2006.01)

(56) References Cited

U.S. PATENT DOCUMENTS

| | | | | |
|---|---|---|---|---|
| 8,254,631 | B2 * | 8/2012 | Bongard | 382/103 |
| 8,346,639 | B2 * | 1/2013 | Hammad et al. | 705/35 |
| 8,564,661 | B2 * | 10/2013 | Lipton et al. | 348/143 |
| 8,624,733 | B2 * | 1/2014 | Cusack, Jr. | 340/541 |
| 2004/0153671 | A1 | 8/2004 | Schuyler | |
| 2005/0104962 | A1 * | 5/2005 | Han et al. | 348/143 |
| 2005/0249382 | A1 * | 11/2005 | Schwab et al. | 382/115 |
| 2007/0098253 | A1 * | 5/2007 | Crespi et al. | 382/159 |
| 2007/0127774 | A1 * | 6/2007 | Zhang et al. | 382/103 |
| 2007/0291118 | A1 * | 12/2007 | Shu et al. | 348/156 |
| 2008/0208680 | A1 * | 8/2008 | Cho | 705/13 |
| 2008/0285802 | A1 | 11/2008 | Bramblet | |

OTHER PUBLICATIONS

Written Opinion International Application No. PCT/EP2011/055919; International Filing date Apr. 14, 2011; Mail date Jun. 10, 2011.

* cited by examiner

CONFIGURABLE ACCESS CONTROL SENSING DEVICE

TECHNICAL FIELD

The present invention generally relates to the technical field of access control e.g. in public and/or commercial buildings and to the monitoring of entries through portals such as doorways. More particularly the present invention relates to a configurable access control sensing device for detecting and monitoring persons entering or exiting through portals and more specifically through so-called man-traps.

BACKGROUND ART

An access control system is a system which enables an authority to control access to areas and resources in a given physical facility or computer-based information system. An access control system, within the field of physical security, is generally seen as the second layer in the security of a physical structure.

Access control systems are typically used in or for situations requiring identification of each and every person (e.g. badge, biometric) in order to access an area. This area is typically accessible through a single door or passage controlled by an ID sensor. The access system may involve an authorized person presenting an access card to a card reader, or may involve fingerprint or retina verification or other means. Access is granted only if the person's credentials are verified and it is ensured that the physical situation is permitted.

When a credential is presented to an ID sensor or reader, the reader sends the credential's information, usually a number, to a control panel with a highly reliable processor. The control panel compares the credential's number to an access control list, grants or denies the presented request, and sends a transaction log to a database. When access is denied based on the access control list, the door remains locked. If there is a match between the credential and the access control list, the control panel operates a relay that in turn unlocks the door. The control panel also ignores a door open signal to prevent an alarm. Often the reader further provides feedback, such as a flashing red LED for an access denied and a flashing green LED for an access granted.

The above description illustrates a single factor transaction. However credentials can be passed around, thus subverting the access control list. For example, Alice has access rights to the server room but Bob does not. Alice either gives Bob her credential or Bob takes it; he now has access to the server room.

To prevent this, two-factor authentication can be used. In a two factor transaction, the presented credential and a second factor are needed for access to be granted. The second factor can be a PIN, a second credential, operator intervention, or a biometric input. Often the factors are characterized as something you have, such as an access badge or passcard,
something you know, e.g. a PIN, or password.
something you are, typically a biometric input A problem is that once the door is open an authorized person can be 'tailgated' by another member of staff or an unauthorized person. Another problem is that an authorized person may open the door, but for some reason not pass through. A conventional access control system is likely to assume the person has passed through. This will have bad implications where the system is required for safety or time and attendance reasons to know if a person is 'in' or 'out'.

The newer access control systems use sensing systems to detect certain of these misuse situations. These sensing systems can detect a limited number of situations. These systems are not capable to enable a situation/application specific access strategy. These systems are not configurable to be adaptable to different imaginable security policies.

The difficulty in these kind of automatic access control systems therefore lies in the correct implementation of security policies defining classes of permitted and rejected physical situations. This is particularly also the case for the so-called man-traps in modern physical security protocols, i.e. to small spaces having two sets of interlocking doors such that the first set of doors must close before the second set opens.

Technical Problem

It is therefore an object of the present invention to provide a configurable access control device which enables implementation of different security policies. This object is achieved by an access control device as claimed in claim 1.

General Description of the Invention

In order to overcome the above-mentioned problem, the present invention provides for an improved access control device for monitoring and controlling the passage of persons through a passageway or a doorway between an inside area and an outside area. The access control device comprises at least one transit authorization request device, such as an ID sensor activated by access card or badge or a biometric sensor (fingerprint, retina), said transit authorization request device to be activated or actuated by a person requesting authorization to pass or transit through said passageway or doorway and a presence detection and tracking device for detecting the presence of a person in the vicinity of said passageway or doorway and for tracking the movement of a person within or through said passageway or doorway. According to the invention, the access control device further comprises a control unit operatively coupled to said at least one transit authorization request device and said presence detection and tracking device. The control unit is configured for controlling, upon activation of said transit authorization request device, said presence detection and tracking device to detect or localize the person having activated or actuated said transit authorization request device, for assigning a virtual transit ticket, such as e.g. a virtual entry ticket or a virtual exit ticket, to said person after authorization to pass through said passageway or doorway has been granted to said person, said virtual transit ticket being representative of the transit privileges granted to said person, i.e. the privileges regarding the transit direction through said passageway of doorway, and for controlling said presence detection and tracking device to track the movement of the person with the virtual transit ticket with respect to the granted transit privileges. The control unit further comprises a processing module with a configurable decision table for generating an output control signal based on an output signal of said at least one transit authorization request device and an output signal of said presence detection and tracking device, said output control signal to be used for the controlling of the passage of persons through a passageway or a doorway.

With the access control system of the present invention, it is possible to implement a freely configurable access control policy, namely based on the assigned virtual transit tickets and the tracking thereof trough the passageway. In fact, the configurable decision table allows to define a plurality of different situations defined and detected by the output signal of the transit authorization request device and the output signal of said presence detection and tracking device, like the presence of one or more persons in the vicinity of the passageway or the transit authorization request device, a transit request from the inside to the outside or from the outside to the inside, simultaneous transit attempts from different persons (in the same direction or in opposite directions), transit attempt in accordance with the assigned access ticket or privilege or in violation of the assigned access ticket or privilege, abortion of a transit motion or U-turn during transit, etc and the associated output signal statuses or signal values of the control unit. Depending on the adopted security policy or access control policy, the output signal statuses may considerably differ between a high security policy, where strict compliance with a restricted access policy is required, and a less severe high throughput policy.

It will be noted, that in the context of the present invention, the expressions “inside area” and “outside area” are only chosen for distinguishing purposes without prejudice to the actual location of these areas. In a classical approach, the inside area will normally be the “high security side”, whereas the “outside area” will be the non-controlled public area. Furthermore it will be appreciated, that the transit authorization request device may be configured for autonomous authentication of a person requesting transit authorization and for issuing an authentication output signal representative of a yes/no access to be granted. Alternatively the transit authorization request device may simply comprise a “credential” reader such as a card or badge reader or a biometric scanner, which issues a “credential ID” to the control unit, in which case said control unit is configured for authentication of the person and for generating the corresponding “yes/no access to be granted” signal. Finally the skilled person will notice that the output control signal of the control unit may be used for controlling an open/close relay of a door, or to generate an alarm signal in case of misuse, or for controlling a status indicator with respect of the actual transit operation.

In order to correctly track the virtual transit ticket or the person to which is has been assigned, the presence detection and tracking device should preferably be able to track a single person out of a group of persons and to follow this person in all the possible dimensions. In a possible embodiment, the presence detection and tracking device therefore comprises some kind of 3D imager and preferably at least one 3D camera preferably operating according to a TOF principle. Such a 3D camera determines depth information simultaneously with the image recordation and thus enables fast tracking in all possible dimensions without requiring huge data processing capabilities of the associated processing unit.

In a possible embodiment of the invention, said control unit assigns an entry ticket to said person after successful authorization upon reception of an entry request signal by said transit authorization request device, said entry ticket granting the privilege to transit from the outside area to the inside area. Upon reception of an exit request signal by said transit authorization request device, said control unit may assign an exit ticket to said person after successful authorization, said exit ticket granting the privilege to transit from the inside area to the outside area.

In a situation where a plurality of persons is present in the area of the passageway, the classical access control systems usually fail to implement a given access policy. In accordance with a preferred embodiment of the present invention and if said presence detection and tracking device detects the presence of a plurality of persons in a specific area in the vicinity of the transit authorization request device, the control unit is preferably configured to assign a transit ticket to the person which was first present in said specific area. In an alternative configuration said control unit is configured to assign a transit ticket to the person, which is located closest to said transit authorization request device. In yet another embodiment, said control unit is configured to assign a transit ticket to the person which first transits through said passageway or doorway (in the direction of requested authorization). In either case, the output signal of the tracking device enables the control unit to generate a misuse output signal based on the configurable decision table as soon as a non-authorized person (i.e. a person which had no transit ticked assigned) attempts to pass the passageway or doorway.

It will be appreciated that based on the above described tracking of respective virtual transit tickets, the present invention enables a reliable counting functionality for inward and outward direction, thus allowing a reliable calculation of the occupancy of the ‘inside’ area.

As described above, the present invention relates to a sensing device combined with a suitable algorithm to enable physical situation detection. The system is easily configurable to different physical situations. Inputs are door open/close sensor and credential reading. Outputs are door unlock signal, alarm, status display/indicator and open/close mechanism.

In the situation of 2 areas (the first called ‘inside’, the second called ‘outside’) separated by a door (or another movable barrier device or a corridor/gate with a virtual door) equipped with a lock mechanism (which could be direction-selective) and a transit authorization request device in each area, the invention may comprise an integrated sensing and control device that controls a door lock mechanism and/or an alarm notification device and/or status indicators, based on a configurable logic that considers a door open status (option) and/or an entry request signal and/or an exit request signal and/or the presence and movement of persons determined by a person detection and tracking device (which can be an optical imaging device like a 3D time of flight range camera and a person detection and tracking algorithm) as inputs.

Optionally the device provides counting functionality for inward and outward direction, allowing the calculation of the occupancy of the ‘inside’ area. This same information of completed transits between inside and outside areas is also useful to a supervising system to hold a more accurate list of persons that are inside or outside the areas in case this is made possible by an identification of the persons entering or leaving the area by a reader on each side of the door.

The logic may consist of one or more of the following steps that are cyclically processed:

1. On reception of an entry request signal, depending on a configurable decision table, entry tickets are assigned to the persons being tracked. In case of multiple presence, the timing of entry into the zone covered by the sensing device and/or the relative position information for the persons with respect to the entry request device and/or the timing of the transit from one side to the other (the person that first transits in the authorized direction gets the ticket assigned) can be used to assign the entry ticket to the right person.
2. On reception of an exit request signal, depending on a configurable decision table, exit tickets are reserved and assigned to the persons transiting from inside to outside area.
3. A configurable decision table based on presence of persons and their ownership of entry tickets and existence of reserved exit tickets determines the door lock state
4. A configurable decision table based on presence of persons and their ownership of entry tickets, the presence of transit of persons inwards or outwards and the door open state determines the alarm state 5. A logic based on the presence of persons and their ownership of entry tickets and the door lock state determines the red/orange/green status display for the outside area
6. A logic based on the existence of reserved exit tickets and the door lock state determines the red/orange/green status display for the inside area The configurability of the logic steps allows the realization of different access policies like a high security policy or a high throughput policy.

By using the information provided by the person presence detection and tracking device, the security level of the access control system can be improved versus state of the art system. By recognizing the position of persons, the sequence of exit/entry requests and movement of persons, situations like tailgaiting, credential passback, U-turns, crossing and aborting a transit can be detected and the access control system can react adequately, preventing or minimizing unallowed access to the inside area. The tracking information also allows the confirmation of completed transits between inside and outside areas which is useful to a supervising system to hold an accurate list of persons that are inside or outside the areas in case when persons identification is provided to the supervising system.

From the above description, it follows that the key features of the present invention include:

- An access control device consisting of a sensing part for presence detection and tracking of persons and of a configurable logic for controlling a lockable barrier and an alarm notification.
- The combination and evaluation of sequence of entry/exit request signals, door open signal, position (location) of persons and entry request device, presence and movement of persons to determine lock and alarm status
- The configurability of the decision logic for lock and alarm status allowing the realization of different access policies implementing different security levels
- The determination and output of an inside and an outside 3-state status display representing 'access denied', 'waiting' and 'access allowed'
- The use of an imaging device combined with an appropriate algorithm to realize the presence detection and tracking of persons
- The determination and output of transit complete information for inward and outward direction
- The computation of inward and outward counters and inside area occupancy for single-door areas It will be noted that the above described access control device can also be applied to mantraps, which are gates that are designed to prevent physical ingress by a non-authorized person due to the presence of two doorways where at any time only one door is open.

In one embodiment, a single presence detection and tracking device may be arranged in the space between the first and second doorways so as to cover the whole mantrap surface. The access control device detects the number of people in the mantrap and can control the door lock of one or both doorways. The control unit can receive up to 4 transit requests (2 for each door) by up to 4 transit authorization request devices (one being e.g. arranged on either side of the two doorways).

In another embodiment, a single presence detection and tracking device is arranged so as to cover the entrance area of the mantrap on either side of the doorway on the unsecure side (outside area) of the mantrap and directly controls the first doorway. The presence detection and tracking device may e.g. be arranged inside of the mantrap in the vicinity of the first doorway. Alternatively the presence detection and tracking device may be located outside of the mantrap in the vicinity of the first doorway.

The access control device keeps track of the people inside the mantrap by counting the people entering and leaving its field of view and by keeping track of the door states. The access control device thus prevents opening the 2nd doorway if more than one person has entered the mantrap. In such a case, the access control device counts the people leaving through the first doorway until the mantrap is empty; in which case the process starts from the beginning.

The access control device also forces people to identify themselves one by one by tracking and counting them. In case only one person has entered the mantrap and identifies itself at the 2nd doorway, the access control device unlocks the 2nd doorway and waits for the door to close again to reset itself.

Alternatively the single access control device is supplemented by a presence detector that confirms that all people have cleared the area of the mantrap outside its field of view before it resets itself. The access control device also controls the flow of people moving from the secure area (inside area) to the unsecure area (outside area) by forcing them to identify themselves before it opens the doorway to the unsecure area (outside area).

In yet another embodiment, two single presence detection and tracking devices covering both the entrance and exit area of the mantrap can be used.

These two presence detection and tracking devices may be both located inside the mantrap in the vicinity of a respective doorway, or both outside of the mantrap in the vicinity of a respective doorway, or one may be located inside the mantrap and the other one outside of the mantrap.

If the mantrap is larger than the cumulated areas of both single presence detection and tracking devices or if the single presence detection devices are mounted outside of the mantrap, one access control unit (master) can keep track of the occupancy of the area of the mantrap that is not monitored by either single presence detection and tracking device by receiving counting and tracking information from the second access control unit (slave). If the mantrap is smaller than the cumulated areas of both single presence detection and tracking devices, the combined number of people under both detection areas can be cumulated by the master.

The access control device keeps track of the flow and presence of people and can drive one or more status indicators inside the mantrap asking people to leave the mantrap or status indicators outside of the mantrap notifying people that the mantrap is occupied.

The described access control device can also be applied to rotating doors. A rotating door is analogous to a mantrap in the sense that it can be used to preventingress of more than one person into a secure area by stopping and reversing its movement. In this embodiment, the open door status of the second doorway of the mantrap is replaced by a door rotation status and the single presence detection and tracking devices can be placed analogously to the mantrap case: a) inside the mantrap b) near the entrance area (on either side) and/or c) near the entrance and exit area. In cases b) and c) the access control device keeps track of the people inside the rotating door by tracking and counting them and knowing the rotation of the door.

DETAILED DESCRIPTION WITH RESPECT TO THE FIGURES

Preferred embodiments of the invention will now be described, by way of example, with reference to the accompanying drawings, wherein FIG. 1 generally shows the different components of an embodiment of an access control system;

Figure 1:
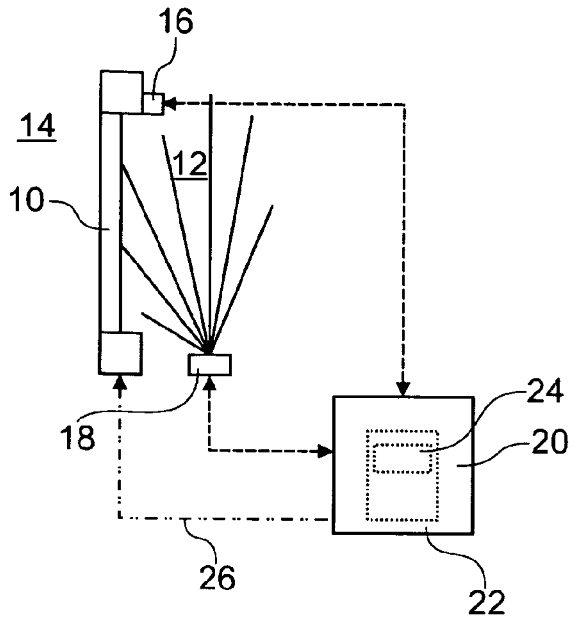

FIG. 1 schematically shows the different components of an embodiment of an access control system according to the present invention. The access control system is configured for controlling an automatic door or barrier 10 in a passageway between an outside area 12 and an inside area 14. The access control system comprises a transit authorization request device 16, e.g. a badge reader or a biometric scanner, which his arranged in the vicinity of the passageway or doorway. In a normal situation, a terminal of the transit authorization request device will be located on both sides of the doorway, one in the "outside area" for enabling persons to request entry into the "inside area", and one in the "inside area" for enabling persons to request exit from the "inside area". A presence detection and tracking device 18, e.g. a 3D camera, is arranged for detecting the presence of a person at least in the doorway itself and in the part of the "outside area", which is located immediately in the vicinity of the doorway and a terminal of the transit authorization request device 16.

A control unit 20 is provided for assigning a virtual transit ticket to a person after authorization to pass through said passageway or doorway 10 has been granted to said person and for controlling said presence detection and tracking device to track the movement of the person with the virtual transit ticket with respect to the granted transit privileges. The control unit 20 comprises a processing module 22 with a configurable decision table 24 for generating an output control signal 26 based on an output signal of said at least one transit authorization request device 16 and an output signal of said presence detection and tracking device 18. The output control signal of the control unit may then be used for the controlling of the passage of persons through a passageway or a doorway 10 or for the activation or deactivation of an alarm device or the like.

Figure 2:
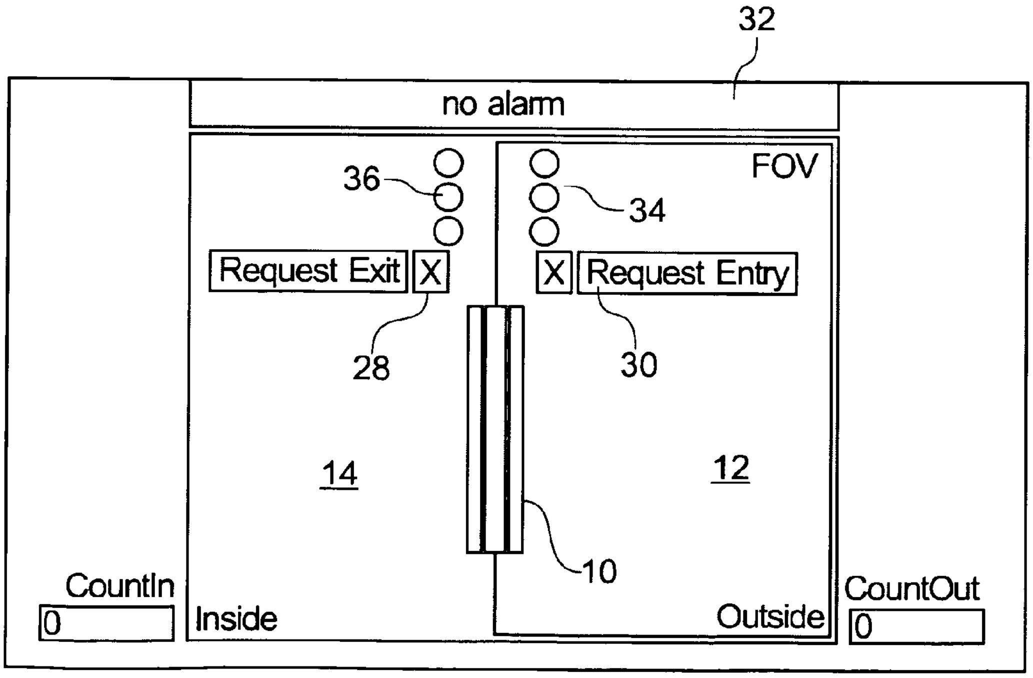
FIG. 2 shows a different view of the access control system on a control screen.

FIG. 2 shows a different view of the access control system on a control screen of the access control device 10. The represented situation includes the following components:

- an inside (secured) area 14, an outside area 12, and a door/turnstile/barrier 10 arranged between the inside area 14 and the outside area 12.
- the area located on the "outside" in the vicinity of the door 10, i.e. the area represented on the right hand side of the door, is covered by the field of view FOV of a camera, which is part of the presence detection and tracking device.
- a device 28 to request exit (badge/button/ . . . ) with digital output and a device 30 to request entry (badge/button/ . . . ) with digital output are arranged at the door, these devices are part of a transit authorization request device 16.
- a door open information and a door lock mechanism for both directions or separately for each direction
- an alarm device (+CCTV trigger, . . . ) 32
- a 3-state display 34 and 36 on each side (optional) (Access denied/Wait/Access allowed)

Figure 3:
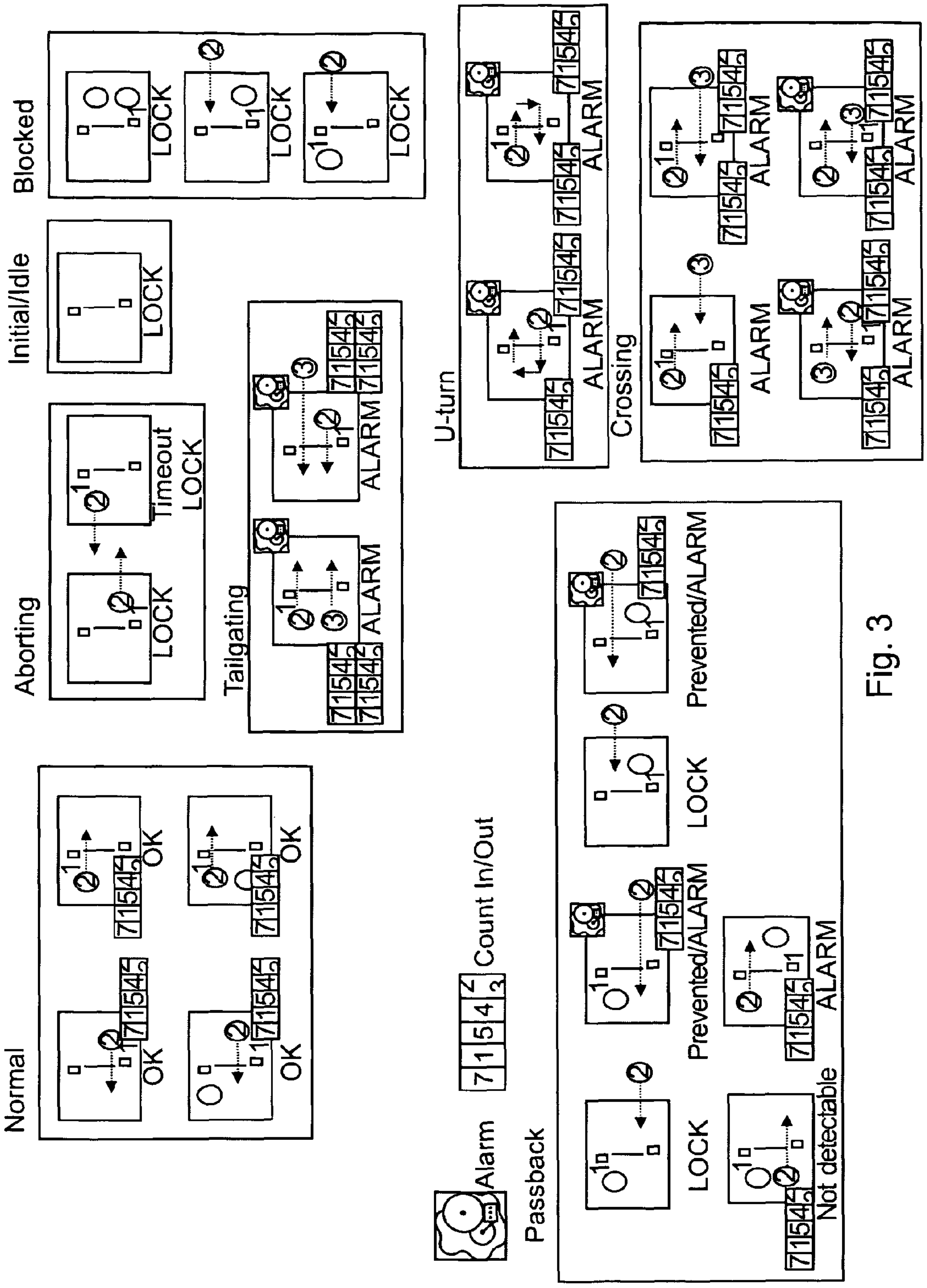
FIG. 3 represents a number of different situations and the corresponding actions in a high security implementation of the access control.
Figure 4:
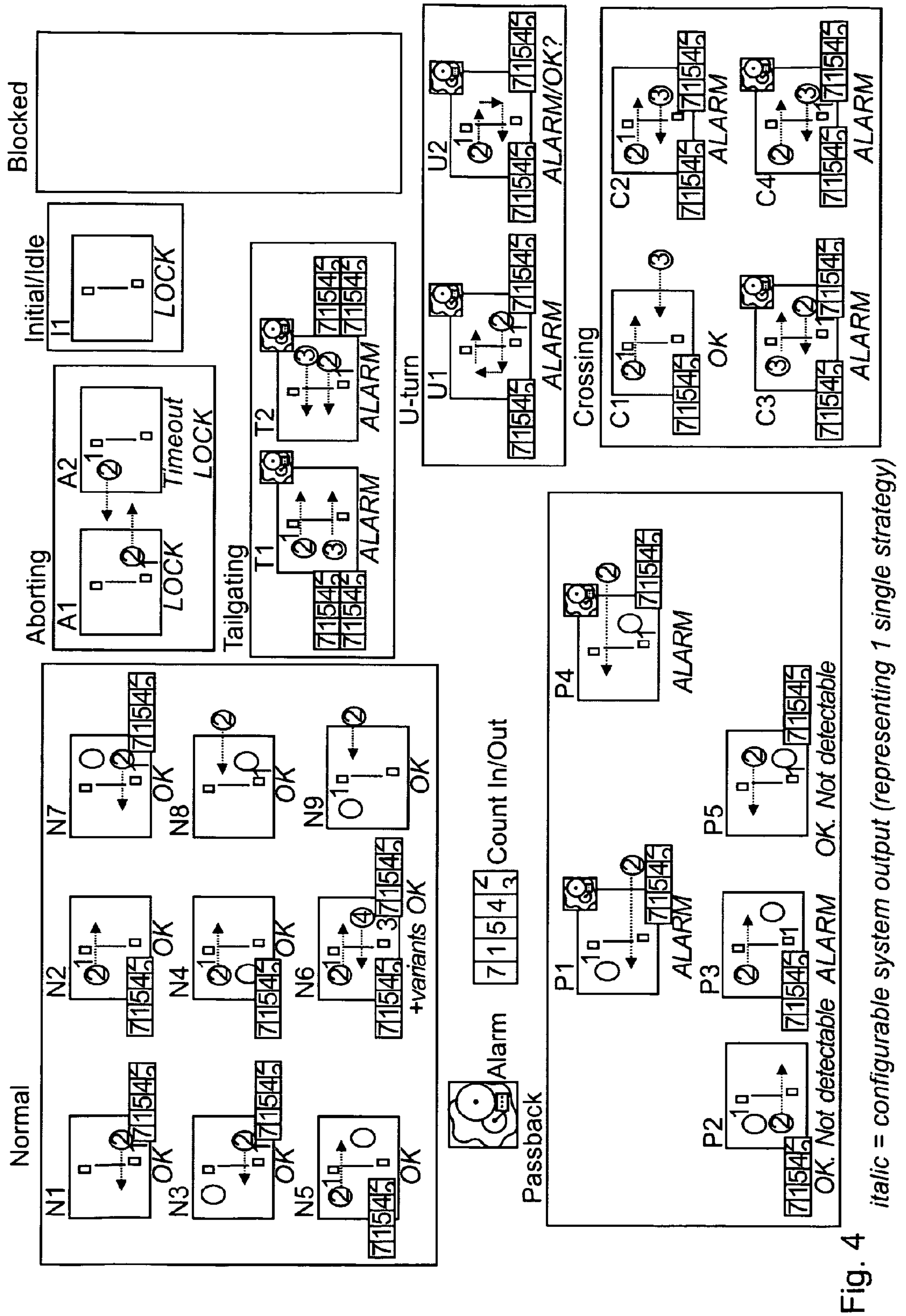
FIG. 4 represents a number of different situations and the corresponding actions in a medium security, high throughput implementation of the access control.

With the above setup, the following steps may be implemented:

1. Assign or reserve EntryTickets for people requesting entry
2. Reserve ExitTickets for people requesting exit
3. Lock door depending of presence or absence of Entry/Exit Tickets
4. Trigger alarm depending on door status and presence, entry or exit of persons without Entry/Exit Tickets
5. Drive displays depending on presence of Entry/Exit Tickets and Lock status Two different possible implementations of access control policies are schematically represented in FIGS. 3 and 4. FIG. 3 represents a number of different situations and the corresponding actions in a high security implementation of the access control, whereas FIG. 4 represents the different situations and the corresponding actions in a medium security, high throughput implementation of the access control.

In the different represented situations, the person requesting entry resp. present in the detection zone are represented by the dots, the inside area is located on the left hand side of the barrier or door and the outside area is located at the right hand side of the door. The activation of the transit authorization request device is represented by the reference sign "1" upon which the "virtual transit ticket" is assigned to the person located closest to the transit authorization request device. Reference signals "2" and "3" refer to the actions following the activation of the transit authorization request device. Based on the above convention, the different scenarios are self-explaining. From FIGS. 3 and 4 it will for instance be appreciated, that a number of situations, which in a high security policy require a "Blocked" action are classified as "normal" action in the low level security policy.

Figure 5:
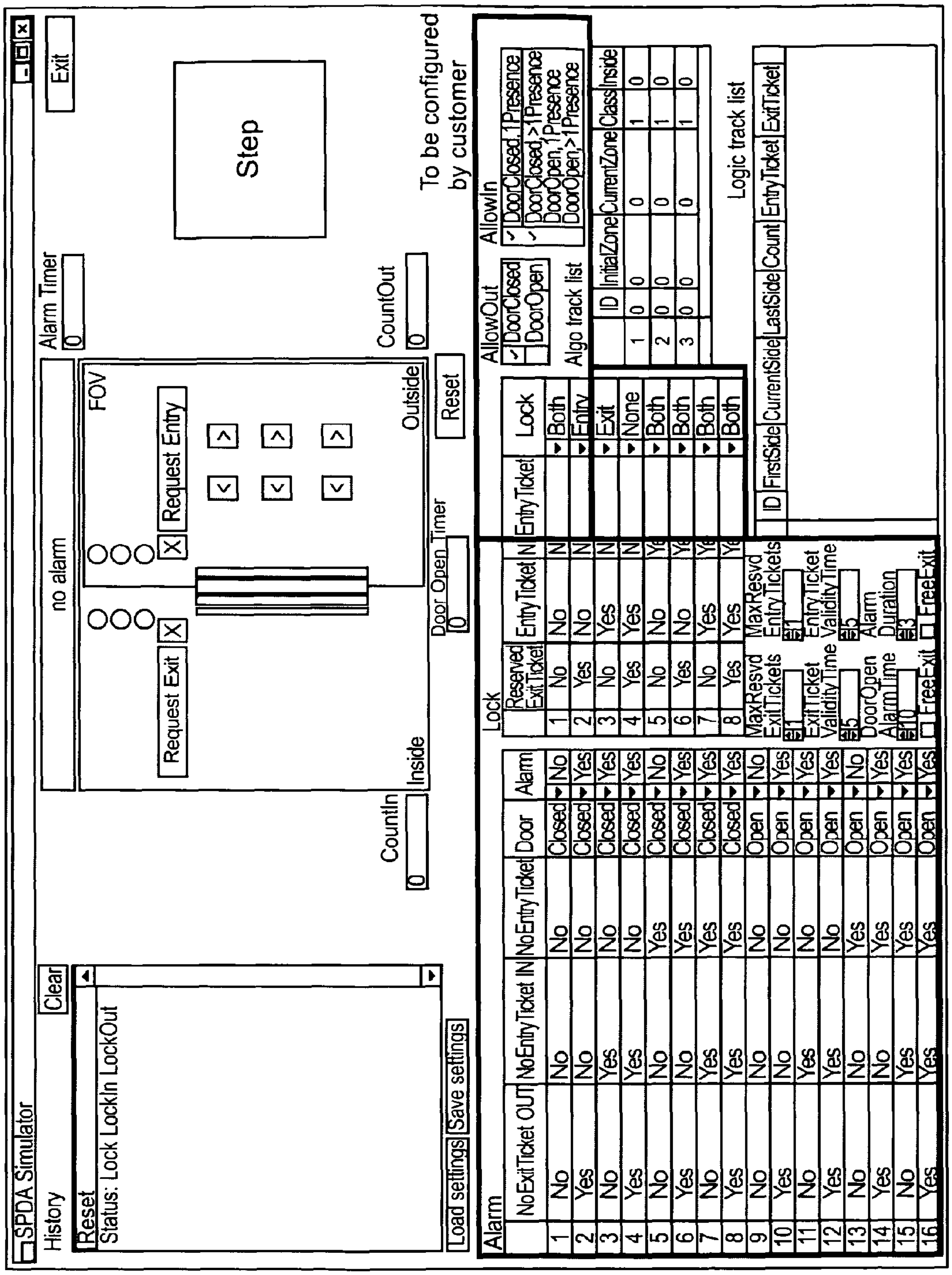
FIG. 5 shows a possible configuration of an interface to the configurable access control system.

A possible implementation of the logic may comprise:

- On EntryRequest if the configurable 'AllowIn' logic allows it, a single track present in FOV gets an EntryTicket. If there are more than one tracks present, an EntryTicket is reserved and will be assigned to the first track crossing the line inwards.
- On ExitRequest if the configurable 'AllowOut' logic allows it, a track with valid ExitTicket is generated and reserved. If Exit is not allowed, a track with denied ExitTicket is generated and reserved. The track will be assigned to the first track entering from inside (crossing the line).
- Entry and ExitTickets have a lifetime (timeout)
- A configurable 'Lock' logic decides based on current situation if door shall be unlocked
- A configurable 'Alarm' logic decides based on current situation if alarm shall be triggered
- The alarm has a configurable duration
- The door open status has a timeout that triggers the alarm
- The inward direction can be allowed for everybody (free entry)
- The outward direction can be allowed for everybody (free exit)
- Count in whenever a track crosses line inwards
- Count out whenever a track crosses line outwards In order to enable the algorithm to distinguish the different situations, it is required to provide the following information (see also FIG. 5)

Provide per person:

- Side the person entered (vs counting line)
- Side the person left (vs counting line), once after person crossed the line or left FOV, even if not visible anymore
- Unique ID (may repeat cyclically)
- Current side (vs counting line)

Inside detection area or not (active)
1 or 2 persons/object

Parameters of AllowIn logic: (4 combinations)
Door open/close
1 track/multiple tracks outside Parameters of AllowOut logic: (2 or 4 combinations)
Door open/close
Reserved ExitTicket already existing/max number of ExitTickets reached
Parameters of Lock logic: (8 combinations)
Reserved ExitTicket present (=ExitRequest present)
Track with EntryTicket present
Track without EntryTicket present Parameters of Alarm logic: (16 combinations)
Door open/close
Track without ExitTicket present=someone came out without permission
Track without EntryTicket present
Track without EntryTicket entered=someone entered without permission Properties of tracks handled by logic:
ID: from algo (−1 for reserved Exit/EntryTickets)
Count: ½ (from algo class ½ persons)
FirstSide: Inside/Outside (from algo)
CurrentSide: Inside/Outside (from algo)
LastSide: None/Inside/Outside (computed form current side)
EntryTicket: remaining validity time/forever/reserved
ExitTicket: remaining validity time/forever/reserved The digital I/Os involved are the following:

Inputs:
EntryRequest (validity checked by external system)
ExitRequest (validity checked by external system)
Door status
Mode switch: idle/application (lock status in idle to be defined)—energy saving
Bypass (=application mode, unlock, no alarm, counting active)—emergency, visitors, cart Outputs:
Lock Inwards
Lock Outwards
Lock (for simple door)
Alarm
Countln pulse—passage complete indicator
CountOut pulse—passage complete indicator
(Error)
Inside Red
Inside Orange
Inside Green
Outside Red
Outside Orange
Outside Green
Configurable Inside/Outside orange It will be appreciated that the present invention is applicable to all kind of automatic door configurations, such as e.g.:

Simple swing door:
use general lock output
door status available

Sliding door:
use general lock output
door status available

Figure 6:
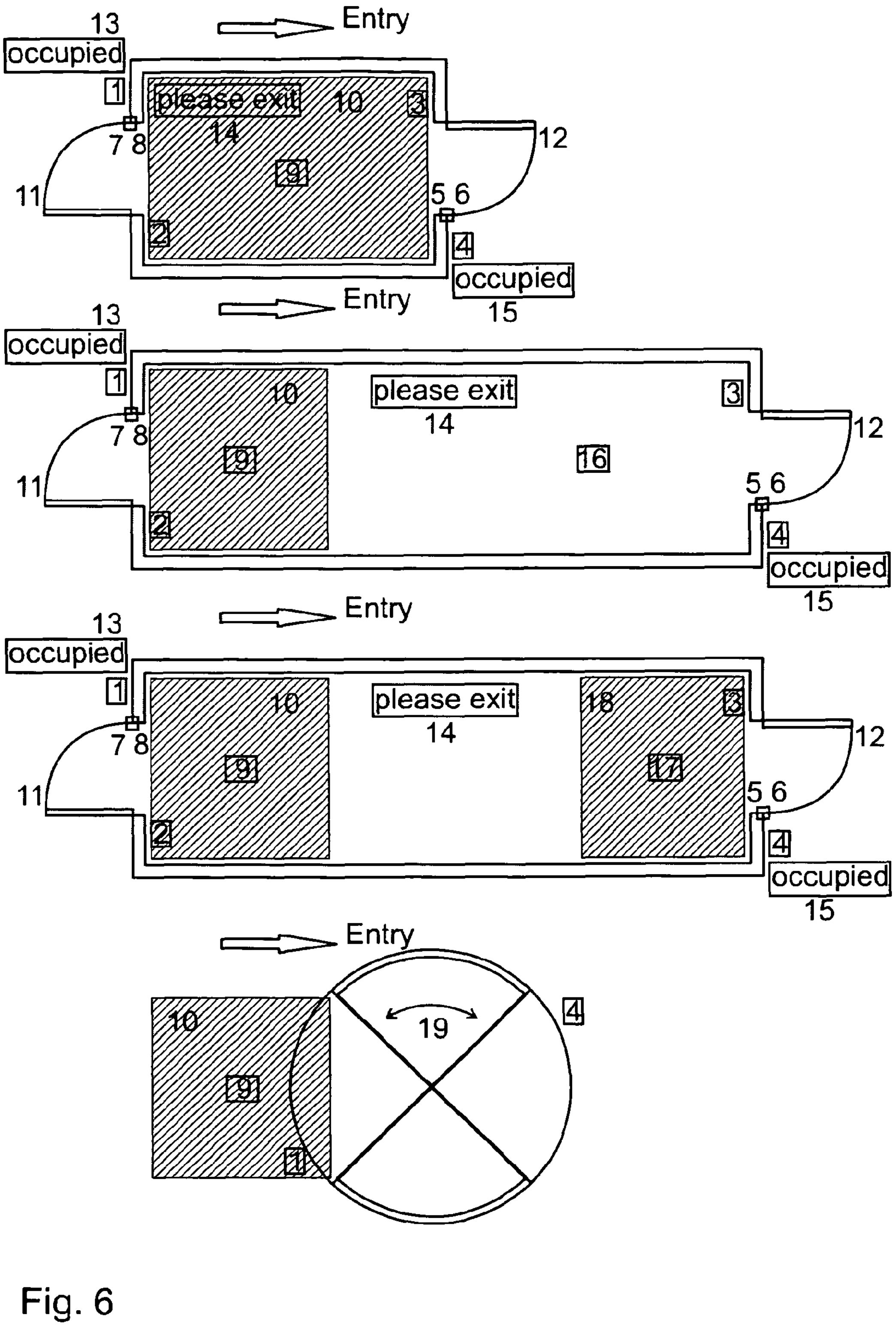
FIG. 6 shows different embodiments of the access control system configured for the use in man-traps or rotating doors.

Turnstile:
use of directional lock output possible
no door status available->fix to open or closed No door:
no use of lock output
no door status available->fix to open or closed FIG. 6 shows several further embodiments of the present invention when applied to mantraps, which are gates that are designed to prevent physical ingress by a non-authorized person due to the presence of two doorways where at any time only one door is open. In FIG. 6 the different reference numbers denote the following features: 1: entry request device (doorway 1), 2: exit request device (doorway 1), 3: entry request device (doorway 2); 4: exit request device (doorway 2); 5: door status (doorway 2); 6: door strike (doorway 2); 7: door status (doorway 1); 8: door strike (doorway 1); 9: presence detection and tracking device (master); 10: field of view (master); 11: doorway 1 (unsecure side); 12: doorway 2 (secure side); 13: status indicator doorway 1 (occupied); 14: status indicator (please exit); 15: status indicator doorway 2 (occupied); 16: presence detector; 17: presence detection and tracking device (slave); 18: field of view (slave); 19: door rotation status.

In one embodiment (shown on top in FIG. 6), a single presence detection and tracking device (FIG. 6—ref. 9) may be arranged in the space between the first and second doorways so as to cover the whole mantrap surface (FIG. 6—ref. 10).

The access control device detects the number of people in the mantrap and can control the door lock (FIG. 6—ref. 6, 8) of one or both doorways (FIG. 6—ref. 11, 12). The control unit can receive up to 4 transit requests (2 for each door) by up to 4 transit request devices (one being e.g. arranged on either side of the two doorways) (FIG. 6—ref. 1, 2, 3, 4).

In another embodiment (second embodiment from the top of FIG. 6), a single presence detection and tracking device (FIG. 6—ref. 9) is arranged so as to cover (FIG. 6—ref. 10) the entrance area of the mantrap on either side of the doorway (FIG. 6—ref. 11) on the unsecure side (outside area) of the mantrap and directly controls the first doorway. The presence detection and tracking device may e.g. be arranged inside of the mantrap in the vicinity of the first doorway. Alternatively the presence detection and tracking device may be located outside of the mantrap in the vicinity of the first doorway.

The access control device keeps track of the people inside the mantrap by counting the people entering and leaving its field of view and by keeping track of the door states (FIG. 6—ref. 5, 7). The access control device thus prevents opening the 2nd doorway (FIG. 6—ref. 12) if more than one person has entered the mantrap. In such a case, the access control device counts the people leaving through the first doorway (FIG. 6—ref. 11) until the mantrap is empty; in which case the process starts from the beginning.

The access control device also forces people to identify themselves one by one by tracking and counting them. In case only one person has entered the mantrap and identifies itself at the 2nd doorway (FIG. 6—ref. 12), the access control device unlocks the 2nd doorway and waits for the door to close again to reset itself.

Alternatively the single access control device is supplemented by a presence detector (FIG. 6—ref. 16) that confirms that all people have cleared the area of the mantrap outside its field of view before it resets itself. The access control device also controls the flow of people moving from the secure area (inside area) to the unsecure area (outside area) by forcing them to identify themselves before it opens the doorway (FIG. 6—ref. 11) to the unsecure area (outside area).

In yet another embodiment (shown in third position from the top of FIG. 6), two single presence detection and tracking devices (FIG. 6—ref. 9, 17) covering both the entrance and exit area of the mantrap can be used. These two presence detection and tracking devices may be both located inside the mantrap in the vicinity of a respective doorway, or both outside of the mantrap in the vicinity of a respective doorway, or one may be located inside the mantrap and the other one outside of the mantrap.

If the mantrap is larger than the cumulated areas of both single presence detection and tracking devices (FIG. 6—ref. 10, 18) or if the single presence detection devices are mounted outside of the mantrap, one access control unit (master) (FIG. 6—ref. 9) can keep track of the occupancy of the area of the mantrap that is not monitored by either single presence detection and tracking device by receiving counting and tracking information from the second access control unit (slave) (FIG. 6—ref. 17). If the mantrap is smaller than the cumulated areas of both single presence detection and tracking devices (FIG. 6—ref. 10, 18), the combined number of people under both detection areas can be cumulated by the master.

The access control device keeps track of the flow and presence of people and can drive one or more status indicators inside the mantrap (FIG. 6—ref. 14) asking people to leave the mantrap or status indicators (FIG. 6—ref. 13, 15) outside of the mantrap notifying people that the mantrap is occupied.

The described access control device can also be applied to rotating doors (shown on the bottom position of FIG. 6). A rotating door is analogous to a mantrap in the sense that it can be used to preventingress of more than one person into a secure area by stopping and reversing its movement. In this embodiment, the open door status (FIG. 6—ref. 15) of the second doorway (FIG. 6—ref. 12) of the mantrap is replaced by a door rotation status (FIG. 6—ref. 19) and the single presence detection and tracking devices can be placed analogously to the mantrap case: a) inside the mantrap b) near the entrance area (on either side) and/or c) near the entrance and exit area. In cases b) and c) the access control device keeps track of the people inside the rotating door by tracking and counting them and knowing the rotation of the door.

The invention claimed is:

1. An access control device for monitoring and controlling the passage of persons through a passageway or a doorway between an outside area and an inside area, said access control device comprising at least one transit authorization request device, said transit authorization request device to be activated by a person requesting authorization to pass through said passageway or doorway;

a presence detection and tracking device for detecting the presence of a person in the vicinity of said passageway or doorway and for tracking the movement of a person within said passageway or doorway, and a control unit operatively coupled to said at least one transit authorization request device and said presence detection and tracking device, said control unit being configured for controlling, upon activation of said transit authorization request device, said presence detection and tracking device to detect and localize, from a group of persons present in the vicinity of said passageway or doorway, the person having activated said transit authorization request device and to identify said person as the requesting person;

assigning a virtual transit ticket to said requesting person after authorization to pass through said passageway or doorway has been granted to said person, said virtual transit ticket being representative of the transit privileges granted to said requesting person, and for controlling said presence detection and tracking device to track the movement of the requesting person with the virtual transit ticket with respect to the granted transit privileges, said control unit comprising a processing module with a configurable decision table for generating an output control signal based on an output signal of said at least one transit authorization request device and an output signal of said presence detection and tracking device, said output control signal to be used for the controlling of the passage of persons through a passageway or a doorway.

2. The access control according to claim 1, wherein said presence detection and tracking device comprises at least one 3D camera.

3. The access control according to claim 1, wherein upon reception of an entry request signal by said transit authorization request device, said control unit assigns an entry ticket to said requesting person after successful authorization, said entry ticket granting the privilege of transit from the outside area to the inside area.

4. The access control according to claim 1, wherein upon reception of an exit request signal by said transit authorization request device, said control unit assigns an exit ticket to said requesting person after successful authorization, said exit ticket granting the privilege of transit from the inside area to the outside area.

5. The access control according to claim 1, wherein if said presence detection and tracking device detects the presence of a plurality of persons in a specific area in the vicinity of the transit authorization request device, said control unit is configured to localize the person which was first present in said specific area as the requesting person having activated said transit authorization request device and to assign said transit ticket to said person which was first present in said specific area.

6. The access control according to claim 1, wherein if said presence detection and tracking device detects the presence of a plurality of persons in a specific area in the vicinity of the transit authorization request device, said control unit is configured to localize the person which first transits through said passageway or doorway as the requesting person having activated said transit authorization request device and to assign said transit ticket to said person which first transits through said passageway or doorway.

7. The access control according to claim 1, wherein if said presence detection and tracking device detects the presence of a plurality of persons in a specific area in the vicinity of the transit authorization request device, said control unit is configured to localize the person which is located closest to said transit authorization request device as the requesting person having activated said transit authorization request device and to assign said transit ticket to said person which is located closest to said transit authorization request device.

8. The access control according to claim 1, wherein said control unit further provides counting functionality for the inward and outward direction.

9. The access control according to claim 1, wherein said passageway or a doorway is a part of a man-trap or a rotating door.

10. The access control according to claim 1, wherein said configurable decision table is configured for mapping a plurality of possible situational configurations defined by said output signal of said at least one transit authorization request device and said output signal of said presence detection and tracking device into a number of individual values of said output control signal.

* * * * *